United States Patent
Clark et al.

(10) Patent No.: US 6,615,337 B1
(45) Date of Patent: Sep. 2, 2003

(54) METHOD AND APPARATUS FOR MAINTAINING COHERENCY IN A TRANSLATION LOOKASIDE BUFFER

(75) Inventors: Michael Clark, Austin, TX (US); Michael A. Filippo, Manchaca, TX (US); Benjamin Sander, Austin, TX (US); Greg Smaus, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 251 days.

(21) Appl. No.: 09/925,954

(22) Filed: Aug. 9, 2001

(51) Int. Cl.⁷ .................................. G06F 12/10
(52) U.S. Cl. .............. 711/205; 711/202; 711/203; 711/204; 711/206; 711/207; 711/137; 711/213
(58) Field of Search ................. 711/202, 203, 711/204, 205, 206, 207, 43, 213, 137

(56) References Cited

U.S. PATENT DOCUMENTS

| | | | | |
|---|---|---|---|---|
| 4,733,350 A | * | 3/1988 | Tone et al. ............... 711/207 |
| 4,964,035 A | * | 10/1990 | Aoyama et al. ............. 712/3 |
| 5,479,629 A | * | 12/1995 | Angjelo et al. ........... 711/206 |
| 5,613,083 A | * | 3/1997 | Glew et al. .............. 711/207 |
| 5,717,898 A | * | 2/1998 | Kagan et al. ............. 711/145 |
| 5,953,520 A | * | 9/1999 | Mallick .................... 703/26 |
| 6,138,225 A | * | 10/2000 | Upton et al. ............. 711/207 |
| 6,145,064 A | * | 11/2000 | Long et al. .............. 711/158 |
| 6,317,810 B1 | * | 11/2001 | Lopez-Aguado et al. ... 711/120 |
| 6,446,189 B1 | * | 9/2002 | Zuraski et al. ........... 711/207 |
| 6,453,387 B1 | * | 9/2002 | Lozano ................... 711/133 |
| 6,571,318 B1 | * | 5/2003 | Sander et al. ............ 711/137 |
| 2003/0018875 A1 | * | 1/2003 | Henry et al. ............. 711/203 |

* cited by examiner

Primary Examiner—Donald Sparks
Assistant Examiner—Jasmine Song
(74) Attorney, Agent, or Firm—Williams, Morgan & Amerson

(57) ABSTRACT

In one illustrative embodiment, an apparatus for controlling a translation lookaside buffer is provided. The apparatus comprises a translation unit, a buffer, and a comparator. The translation unit is adapted to initiate a table walk process to convert a virtual memory address to a physical address. The buffer is adapted to store pending memory access requests previously processed by the translation unit. The comparator is adapted to determine if a physical address generated by the table walk process of the translation unit conflicts with a physical address of at least one of the pending memory access requests, and deliver a control signal to the translation unit for canceling the table walk process in response to determining that a conflict exists.

27 Claims, 3 Drawing Sheets

METHOD AND APPARATUS FOR MAINTAINING COHERENCY IN A TRANSLATION LOOKASIDE BUFFER

BACKGROUND OF THE INVENTION

1. Field of the Invention

The present invention is generally related to the field of memory management in a computer system, and, more particularly, to a method and apparatus for controlling a translation lookaside buffer.

2. Description of the Related Art

Modern computer systems commonly use virtual storage as an effective memory management technique in a multi-tasking environment. That is, instructions and data references to memory produced by a program within a central processing unit (CPU) are isolated from physical memory using mapping procedures, such as segmentation and/or paging. To translate a virtual address to a physical address with paging, for example, the virtual address is separated into a frame number and an offset, and a lookup in a page table translates, or maps, the virtual memory reference into a physical memory location consisting of a corresponding page number and the same offset. Generally, every memory reference in a fetch-execute cycle goes through this translation process.

One advantage of virtual storage for memory management arises out of the separation of logical and physical memory. That is, the logical and physical memory does not have to be the same size. The size of the logical memory is established by the number of bits in the address space of an instruction word. The size of the physical memory is theoretically determined by the size of the memory address register and the size of the page number and offset in the page table. Practically, however, it is determined by the amount of installed memory. Accordingly, the virtual memory can be substantially larger than the physical memory.

One significant disadvantage of virtual storage is that it slows the overall operation of the computer system. First, every memory access is subject to the translation process, adding significant time to each memory access. Moreover, the page table can be relatively large, and, thus, is normally stored in a relatively slow hard disk drive. Thus, the time required to perform each memory access is compounded by adding an additional access to the relatively slow hard disk drive.

To regain some of the speed lost to the translation process, a small, relatively expensive, high-speed buffer stores a subset of the page table translations. These buffers are commonly referred to as translation lookaside buffers, and they maintain the most recent translations. The TLB is generally effective at substantially reducing the amount of time consumed by the translation process when the translation for the current memory access is stored in the TLB.

In modern CPUs, the operation of the TLB may be less than ideal. Commonly, these CPUs prefetch a plurality of instructions and prepare them for execution in advance. Owing to branches in a program, it is possible that the prefetched instructions will not be used if the branch is incorrectly predicted. Accordingly, the CPU includes a provision for flushing the incorrectly prefetched instructions and resetting the status of the CPU to its proper state at the time that the incorrectly predicted branch was taken. The prepatory work done on the prefetched instructions is not commited to the state of the CPU until time for execution so as to minimize the resetting operation. For example, instructions and data references to memory may require the page table and the translation lookaside buffer to be updated. However, the CPU does not allow the speculative updates to be committed to the page table or the translation lookaside buffer, effectively stalling the prefetch operations.

The present invention is directed to a method of solving, or at least reducing the effects of, some or all of the aforementioned problems.

SUMMARY OF THE INVENTION

In one aspect of the present invention, a method is provided for controlling a translation lookaside buffer. The method is comprised of receiving a virtual memory address, and initiating a table walk process to convert the virtual memory address to a physical address. A physical address generated by the table walk process is examined to determine if a conflict with a physical address of a pending memory access request exists. The table walk process is cancelled in response to determining that the conflict exists.

In another aspect of the instant invention, an apparatus for controlling a translation lookaside buffer is provided. The apparatus comprises a translation unit, a buffer, and a comparator. The translation unit is adapted to initiate a table walk process to convert a virtual memory address to a physical address. The buffer is adapted to store pending memory access requests previously processed by the translation unit. The comparator is adapted to determine if a physical address generated by the table walk process of the translation unit conflicts with a physical address of at least one of the pending memory access requests, and deliver a control signal to the translation unit for canceling the table walk process in response to determining that a conflict exists.

BRIEF DESCRIPTION OF THE DRAWINGS

The invention may be understood by reference to the following description taken in conjunction with the accompanying drawings, in which like reference numerals identify like elements, and in which.

Figure 1:
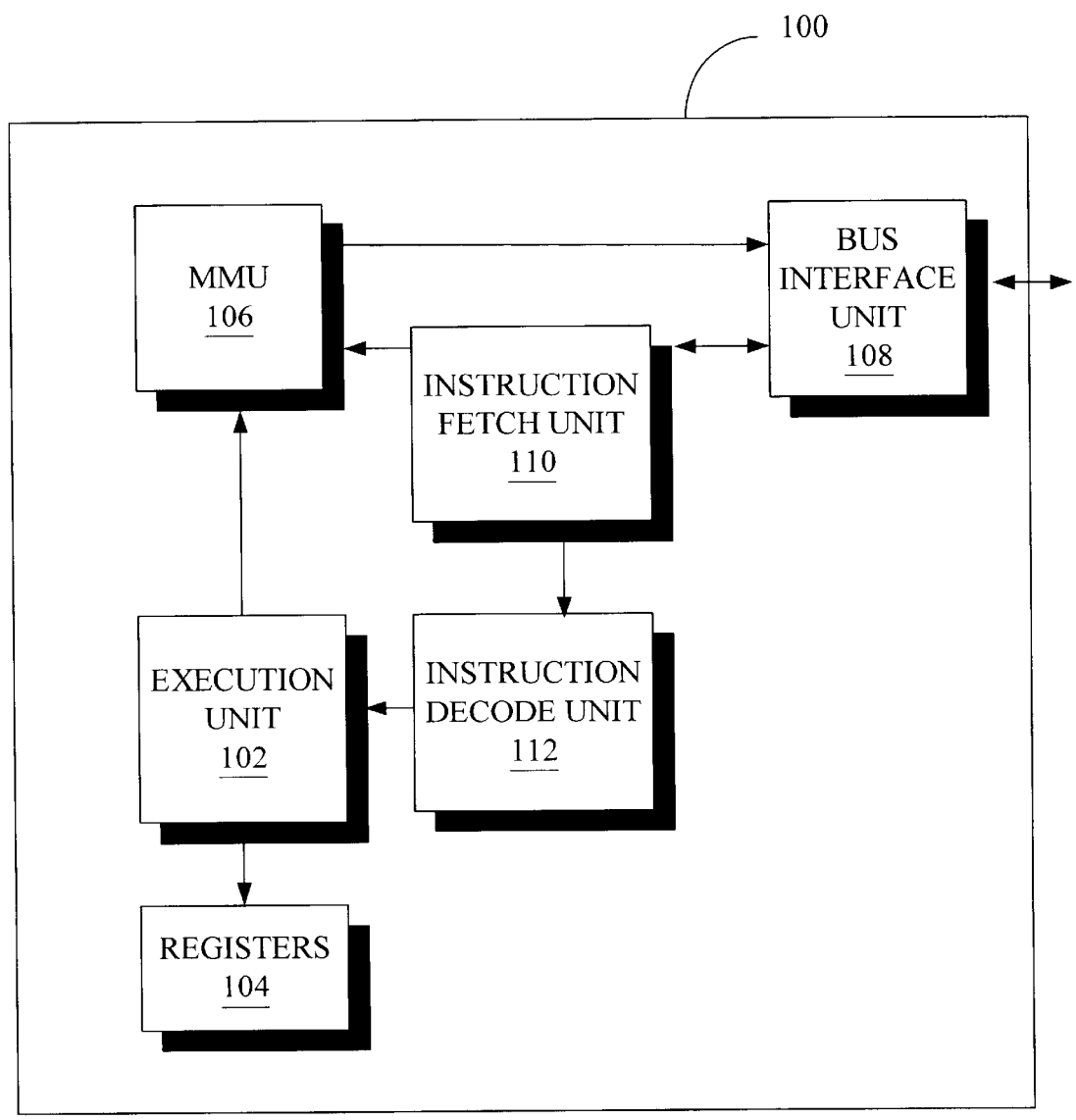
FIG. 1 illustrates one embodiment of a top level block diagram of a central processing unit.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to FIGS. 1–3. In general, the present invention is directed to a central processing unit 100 with advanced controls for managing virtual to physical address translations. The central processing unit 100 may take on any of a variety of forms, such as a microprocessor. The microprocessor architecture illustrated herein is an X86 type, but the instant invention may find application in other CPU architectures.

As shown in FIG. 1, the CPU 100 includes a plurality of functional blocks, such as an execution unit 102, registers 104, a memory management unit (MMU) 106, a bus interface unit 108, instruction fetch unit 110, and an instruction decode unit 112. More or fewer functional blocks may be included within a particular embodiment of the CPU 100; however, for an understanding of the instant invention it may be useful to at least briefly describe the interaction of the functional blocks 102–112.

The execution unit 102 is generally responsible for the execution of each instruction in a software program. The execution unit 102 generally contains a control unit (not shown) and an arithmetic logic unit (ALU, not shown). The control unit controls the individual steps performed in executing the instructions, and the ALU provides standard computational capabilities for the registers 104.

The instructions to be executed by the execution unit 102 are provided to the execution unit 102 by the instruction decode unit 112. The instruction decode unit 112 may operate to provide some initial processing or decoding of each instruction before delivering the instruction to the execution unit 102. Commonly, the instructions, at least initially, are stored in memory (not shown) external to the CPU 100, and, thus, must be retrieved into the CPU 100 before they can be executed. The instruction fetch unit 110 is generally responsible for controlling the process of retrieving the instructions from memory.

The instruction fetch unit 110 "knows" the virtual or logical address of the instructions to be retrieved from memory, but not the physical address. Thus, the instruction fetch unit 110 passes its request for the instructions to the MMU 106. The MMU 106 is generally responsible for translating the virtual or logical address provided by the instruction fetch unit 110 to its corresponding physical address. This physical address is delivered to the bus interface unit 108. Generally, the bus interface unit 108 independently interacts with the external memory to receive information from and deliver information thereto. This information can be in the form of data and/or instructions. Thus, the bus interface unit 108 delivers the physical address provided by the MMU 106 over a bus to the external memory in the form of a load or read operation. The external memory responds to the load or read operation by delivering the contents of the requested memory address to the bus interface unit 108. The bus interface unit 108 then forwards the retrieved contents, which in this case is an instruction(s), to the instruction fetch unit 110.

The MMU 106 may also be accessed by the execution unit 102. For example, during the execution of instructions, the execution unit 102 routinely encounters instructions that require a memory reference, such as storing to or reading from a specified memory address. These addresses are also logical or virtual addresses, and thus, are translated by the MMU 106 into physical addresses. The MMU 106 forwards the corresponding physical address to the bus interface unit 108 so that an operation requested by the instruction may be carried out on the appropriate physical address, e.g., read, store, etc.

Figure 2:
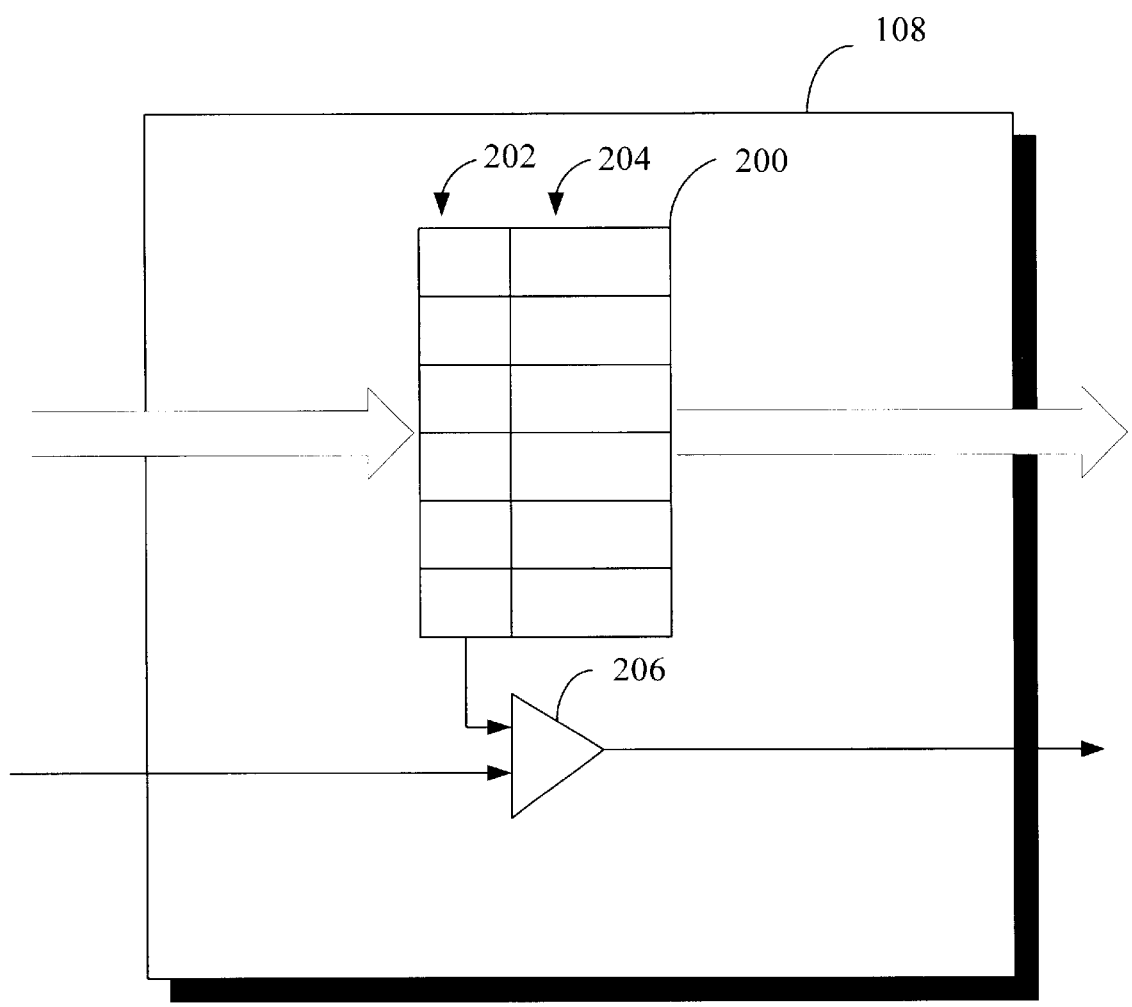
FIG. 2 depicts a block diagram of a portion of a bus interface unit of FIG. 1.

Turning now to FIG. 2, a block diagram representation of at least a portion of the bus interface unit 108 is shown. The bus interface unit 108 is generally responsible for interfacing with external memory over a bus. It is possible that a plurality of requests to retrieve data from or write data to the external memory may be concurrently pending. That is, the MMU 106 may produce addresses and corresponding memory access requests at a rate that outstrips the ability of the bus interface unit 108 and/or the external memory to respond. Accordingly, the bus interface unit 108 includes a load/store buffer 200 that is capable of storing a plurality of memory access requests (e.g., read and write operations). As each memory access request is received by the bus interface unit 108, it is placed in the load/store buffer 200. Any of a variety of algorithms may be employed to determine the order in which the memory access requests will be handled without departing from the spirit and scope of the instant invention. For example, the load/store buffer 200 may be configured to handle the memory access requests on a first-in-first-out (FIFO) basis. Additionally, the load/store buffer 200 may take on any of a variety of configurations, but generally includes a first region 202 adapted to store the physical memory address associated with the memory access request, and a second region 204 adapted to store data associated with the memory access request.

During the operation of the MMU 106, the address translation process may need to "know" which of the previously issued memory access requests remain pending in the load/store buffer 200. As discussed more fully below in conjunction with a translation lookaside buffer (TLB) 308 (see FIG. 3) within the MMU 106, the TLB 308 may not be allowed to commit a speculative memory access request if a memory access request that is pending in the load/store buffer will access that same physical memory location. Accordingly, a comparator 206 is employed to determine if the speculative memory access will "collide" with a pending memory access request. The comparator 206 has a first input terminal coupled to receive the addresses stored in the first region 202 of the load/store buffer 200, and a second input terminal coupled to receive a physical address used by the MMU 106. A match or "hit" signal generated by the comparator 206 indicates that the memory access request currently pending in the MMU 106 may collide or otherwise conflict with a memory access request that is still pending in the load/store buffer.

Figure 3:
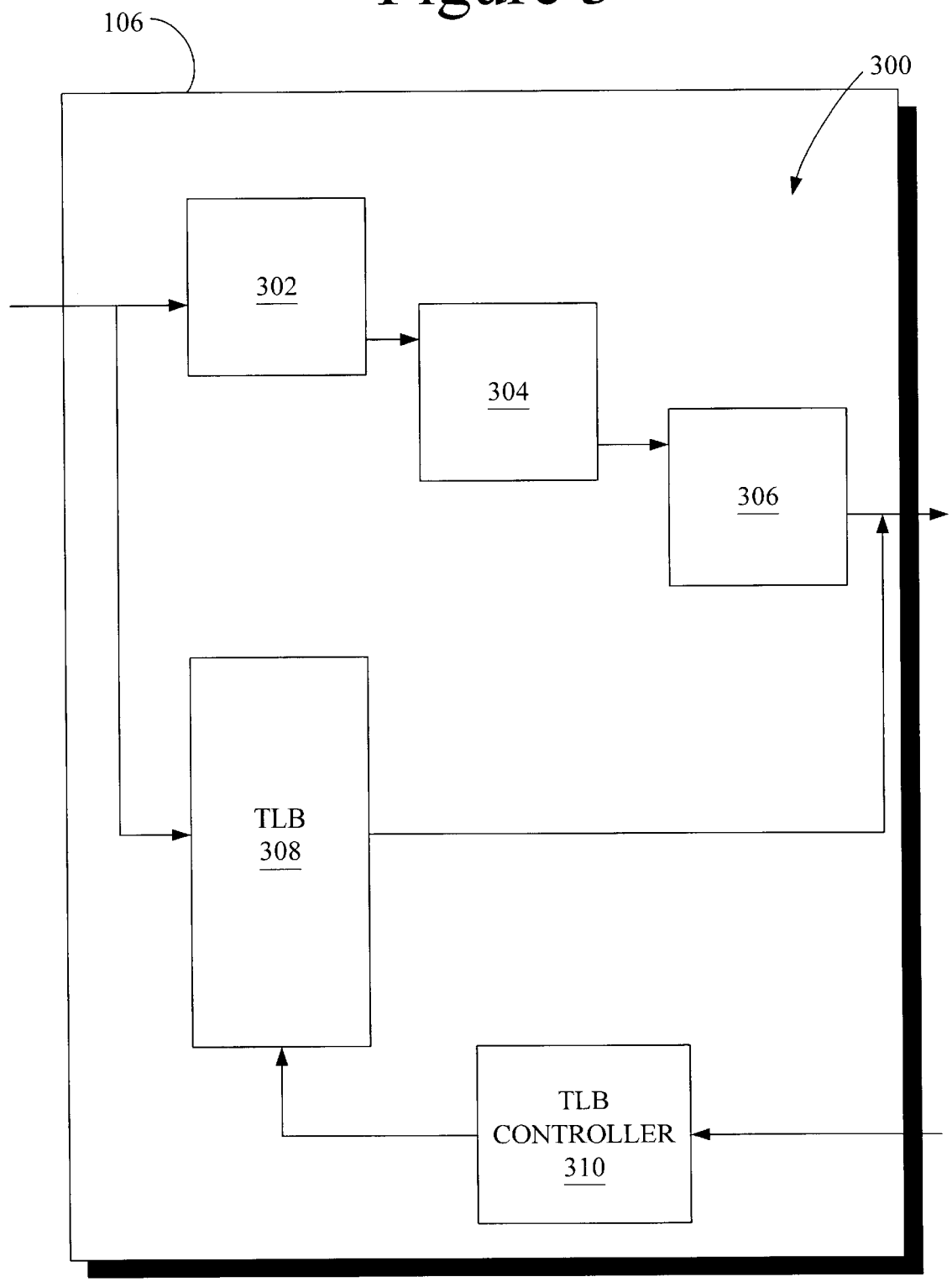
FIG. 3 illustrates a block diagram of a portion of a memory management unit of FIG. 1.

Turning now to FIG. 3, a stylized block diagram of a portion of the MMU 106 of FIG. 1 is shown. In particular, a translation unit 300 of the MMU 106 responsible for translating between virtual and physical addresses is shown. In the illustrated embodiment, the translation unit 300 is comprised of a three-level page table lookup scheme. That is, a virtual address delivered to the MMU 106 is used to access data stored at a physical address in a first table 302. The data contained in the first table 302 may include a starting address, which is a physical address, for a select one of a plurality of second tables 304. Similarly, the data stored at an identified location in the second table 304 is used to access data stored at a physical address in a select one of a plurality of third tables 306, which may include the current corresponding physical address associated with the original virtual address. The process of identifying the appropriate tables 302, 304, 306 and retrieving data stored therein to produce the ultimate physical address is commonly referred to as "walking the tables." The process of walking the tables is well known to those skilled in the art, and, thus, is not discussed in further detail herein so as to avoid obscuring the instant invention.

A cache, commonly referred to as the translation lookaside buffer (TLB) 308, may be used to improve the speed of this translation process. As will be appreciated from the foregoing description of the process of walking the tables, the translation process may involve multiple accesses to the relatively slow main memory. The TLB 308 may be used to store the results of these table walks so that subsequent memory access requests to the same address may be quickly retrieved from the TLB 308 rather than forcing the extended table walk process to be repeated. Generally, a TLB controller 310 is responsible for determining when a translation should be cached in the TLB 308.

Referring now to FIGS. 2 and 3 simultaneously, the interoperation of the load/store buffer 200, the TLB 308, and the TLB controller 310 may be appreciated. Each of the physical addresses generated by, or for, the tables 302, 304, 306 are ultimately delivered to the bus interface unit 108 and, in particular, to the comparator 206. The comparator 206 compares these physical addresses to the addresses currently stored in the load/store buffer 200. This process is generally referred to as a back-probe, and the purpose of the comparison is to determine if any older memory access requests, such as a write operation, are directed to the same physical address, but have yet to be performed. If such a write operation remains to be performed, then the distinct possibility exists that the data stored at the conflicting address may be altered by the older, pending write operation. Thus, a table walk based on the data currently contained in the physical memory may produce a translated physical address that is incorrect. That is, if the table walk uses the "old" data to perform the translation, then a first physical address may be derived. If, however, the table walk uses the altered data, then a second, correct physical address may be derived.

Accordingly, a match, collision, or hit condition detected by the comparator 206 is communicated back to the TLB controller 310, which causes the table walk to be aborted. That is, because a conflict exists, the table walk process is not allowed to complete, and thus, the TLB 308 will not cache the results of the table walk. Rather, an address collision, at any level in the table walk causes the TLB controller 310 to cancel the table walk process. The memory access request that resulted in the collision is not completed, but rather, is forced to retry at a later time. This process of forcing the memory access request to retry may be repeated until such time as the load/store buffer 200 processes the pending memory access request that caused the collision.

On the other hand, if no collision occurs, then the table walk proceeds to the next level of translation and continues until either a subsequent collision occurs or the table 306 produces the actual physical address. The TLB controller 310 responds to the physical address produced by the table 306 by placing the virtual address and the translated physical address in the TLB 308.

Using the process described herein, the TLB controller 310 may allow the MMU 106 to translate speculative memory access requests and commit their results to the TLB 308 without jeopardizing the coherency of the TLB 308. This process is particularly advantageous in that it allows substantially higher performance of the MMU 106. This approach offers an increased opportunity to overlap latency of a TLB fetch operation with other work within the processor. Using the method described herein, the MMU 106 need not stall until the memory access request is non-speculative. This process allows multiple TLB fetch operations to be performed in rapid succession, which may be particularly advantageous in back-to-back TLB fetch operations.

In one embodiment of the instant invention, it may be useful to place an additional constraint on when the TLB controller 310 is permitted to perform a table walk and cache the resulting translation in the TLB 308. In some instances it may be possible for an older memory access request to be pending, but not yet complete, in that it has not yet received its corresponding physical address via the table walk. In the instances described above, the memory access requests stored in the load/store buffer 200 have completed the translation process but have not yet written their data to memory. Thus, collisions may be detected by comparing their physical address with the physical addresses generated during the current table walk. However, where the table walk process for an earlier memory access request has not yet been completed, then the MMU 106 cannot be assured that an address collision will not occur because the physical address of the older memory access request has yet to be determined.

Thus, to reduce the possibility of an address collision with any earlier, but yet incomplete translations, the presence of an ongoing and incomplete translation may be used to prevent a table walk process from being initiated. Generally, the bus interface unit 108 maintains a list of pending memory access requests and an indication of which requests have yet to receive their physical address. Thus, prior to beginning a table walk, the TLB controller 310 checks or otherwise receives a signal from the bus interface unit 108 indicating that all prior memory access requests have/have not received their corresponding physical address. Where all physical addresses have not been received, the TLB controller 310 prevents a subsequent table walk from proceeding.

In one embodiment, the load/store buffer 200 may include an additional bit that is set when the physical address corresponding to a pending memory access request is determined and stored therein. In one exemplary embodiment, the memory access request may be presented to and stored in the load/store buffer 200 prior to being submitted to, or during, the table walk process. At that time, the additional bit is not asserted, indicating that the memory access request has not yet received its physical address. Once the MMU 106 is ultimately successful in obtaining the physical address, the load/store buffer 200 places the physical address in the first region 204 and sets the additional bit. With the additional bit set (assuming all other additional bits are set), any subsequent memory access requests are free to begin the table walk process.

On the other hand, if the additional bit has not been set, then a subsequent memory access request is not permitted to begin a table walk, but rather, is forced to retry at a later time. This process of forcing the memory access request to retry may be repeated until such time as the pending memory access request completes its table walk and a physical address is determined.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for controlling a translation lookaside buffer, comprising:
   receiving a virtual memory address;
   initiating a table walk process to convert the virtual memory address to a physical address;
   comparing at least one intermediate physical address generated by the table walk process with a physical address of a memory access request that has not yet been completed to determine if a match exists; and
   canceling the table walk process in response to detecting a match.

2. A method, as set forth in claim 1, wherein comparing at least one intermediate physical address generated by the table walk process with a physical address of a memory access request that has not yet been completed to determine if a match exists further comprises comparing at least one intermediate physical address generated by the table walk process with a physical address of a memory storage request that has not yet been completed to determine if a match exists.

3. A method, as set forth in claim 1, further comprising reinitiating the table walk process to convert the virtual memory address to a physical address in response to the table walk process being cancelled.

4. A method, as set forth in claim 1, further comprising reinitiating the table walk process to convert the virtual memory address to a physical address each time the table walk process is cancelled.

5. A method, as set forth in claim 1, wherein initiating the table walk process to convert the virtual memory address to a physical address further comprises initiating a plurality of table lookups wherein an output from at least one of the table lookups is an intermediate physical address.

6. A method, as set forth in claim 1, wherein initiating a table walk process to convert the virtual memory address to a physical address is blocked in response to detecting a prior incomplete table walk process.

7. A method, as set forth in claim 1, wherein comparing at least one intermediate physical address generated by the table walk process with a physical address of a memory access request that has not yet been completed to determine if a match exists further comprises comparing at least one intermediate physical address generated by the table walk process with a physical address of all memory access requests that have not yet been completed to determine if a match exists.

8. A method, as set forth in claim 1, wherein comparing at least one intermediate physical address generated by the table walk process with a physical address of a memory access request that has not yet been completed to determine if a match exists further comprises comparing all intermediate physical address generated by the table walk process with a physical address of all memory access requests that have not yet been completed to determine if a match exists.

9. A method for controlling a translation lookaside buffer, comprising:
   receiving a virtual memory address;
   initiating a table walk process to convert the virtual memory address to a physical address;
   determining if a physical address generated by the table walk process conflicts with a physical address of a pending memory access request; and
   canceling the table walk process in response to determining that a conflict exists.

10. A method, as set forth in claim 9, wherein determining if the physical address generated by the table walk process conflicts with the physical address of a pending memory access request further comprises comparing at least one intermediate physical address generated by the table walk process with a physical address of a memory storage request that has not yet been completed to determine if a match exists.

11. A method, as set forth in claim 9, further comprising reinitiating the table walk process to convert the virtual memory address to a physical address in response to the table walk process being cancelled.

12. A method, as set forth in claim 9, further comprising reinitiating the table walk process to convert the virtual memory address to a physical address each time the table walk process is cancelled.

13. A method, as set forth in claim 9, wherein initiating the table walk process to convert the virtual memory address to a physical address further comprises initiating a plurality of table lookups wherein an output from at least one of the table lookups is an intermediate physical address.

14. A method, as set forth in claim 9, wherein initiating a table walk process to convert the virtual memory address to a physical address is blocked in response to detecting a prior incomplete table walk process.

15. A method, as set forth in claim 9, wherein determining if a physical address generated by the table walk process conflicts with a physical address of a pending memory access request further comprises comparing at least one intermediate physical address generated by the table walk process with a physical address of a memory access request that has not yet been completed to determine if a match exists.

16. A method, as set forth in claim 15, wherein comparing at least one intermediate physical address generated by the table walk process with a physical address of a memory access request that has not yet been completed to determine if a match exists further comprises comparing at least one intermediate physical address generated by the table walk process with a physical address of all memory access requests that have not yet been completed to determine if a match exists.

17. A method, as set forth in claim 15, wherein comparing at least one intermediate physical address generated by the table walk process with a physical address of a memory access request that has not yet been completed to determine if a match exists further comprises comparing all intermediate physical address generated by the table walk process with a physical address of all memory access requests that have not yet been completed to determine if a match exists.

18. An apparatus for controlling a translation lookaside buffer, comprising:
   means for receiving a virtual memory address;
   means for initiating a table walk process to convert the virtual memory address to a physical address;
   means for determining if a physical address generated by the table walk process conflicts with a physical address of a pending memory access request; and
   means for canceling the table walk process in response to determining that a conflict exists.

19. An apparatus for controlling a translation lookaside buffer, comprising:
   a translation unit adapted to initiate a table walk process to convert a virtual memory address to a physical address;
   a buffer being adapted for storing pending memory access requests previously processed by said translation unit;
   a comparator adapted to determine if a physical address generated by the table walk process of the translation unit conflicts with a physical address of at least one of the pending memory access requests, and delivering a control signal to the translation unit for canceling the table walk process in response to determining that a conflict exists.

20. An apparatus, as set forth in claim 19, wherein the comparator is further adapted to compare at least one intermediate physical address generated by the table walk process with a physical address of a memory storage request that has not yet been completed to determine if a match exists.

21. An apparatus, as set forth in claim 19, further comprising means for reinitiating the table walk process to convert the virtual memory address to a physical address in response to the table walk process being cancelled.

22. An apparatus, as set forth in claim 19, further comprising means for reinitiating the table walk process to convert the virtual memory address to a physical address each time the table walk process is cancelled.

23. An apparatus, as set forth in claim 19, wherein the translation unit is further adapted to initiate a plurality of table lookups wherein an output from at least one of the table lookups is an intermediate physical address.

24. An apparatus, as set forth in claim 19, further comprising means for blocking the table walk process to convert the virtual memory address to a physical address in response to detecting a prior incomplete table walk process.

25. An apparatus, as set forth in claim 19, wherein the comparator is further adapted to compare at least one intermediate physical address generated by the table walk process with a physical address of a memory access request that has not yet been completed to determine if a match exists.

26. An apparatus, as set forth in claim 25, wherein the comparator is further adapted to compare at least one intermediate physical address generated by the table walk process with a physical address of all memory access requests that have not yet been completed to determine if a match exists.

27. An apparatus, as set forth in claim 25, wherein the comparator is further adapted to compare all intermediate physical address generated by the table walk process with a physical address of all memory access requests that have not yet been completed to determine if a match exists.

* * * * *

UNITED STATES PATENT AND TRADEMARK OFFICE
CERTIFICATE OF CORRECTION

PATENT NO.     : 6,615,337 B1                                              Page 1 of 1
DATED          : September 2, 2003
INVENTOR(S)    : Michael Clark et al.

It is certified that error appears in the above-identified patent and that said Letters Patent is hereby corrected as shown below:

Column 2,
Line 1, replace "commited" with -- committed --.

Signed and Sealed this

Twenty-first Day of October, 2003

JAMES E. ROGAN
*Director of the United States Patent and Trademark Office*